United States Patent
Asari

(10) Patent No.: US 10,226,969 B2
(45) Date of Patent: Mar. 12, 2019

(54) HEAVY LOAD TIRE WITH CURVED SIDEWALL RECESS

(71) Applicant: BRIDGESTONE CORPORATION, Tokyo (JP)

(72) Inventor: Jyunya Asari, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 597 days.

(21) Appl. No.: 14/415,913

(22) PCT Filed: Feb. 21, 2014

(86) PCT No.: PCT/JP2014/054122
§ 371 (c)(1),
(2) Date: Jan. 20, 2015

(87) PCT Pub. No.: WO2014/129571
PCT Pub. Date: Aug. 28, 2014

(65) Prior Publication Data
US 2015/0231934 A1    Aug. 20, 2015

(30) Foreign Application Priority Data

Feb. 22, 2013  (JP) ................................. 2013-033450

(51) Int. Cl.
*B60C 13/02* (2006.01)
*B60C 15/00* (2006.01)
*B60C 5/00* (2006.01)
*B60C 9/02* (2006.01)

(52) U.S. Cl.
CPC ................ *B60C 13/02* (2013.01); *B60C 5/00* (2013.01); *B60C 9/02* (2013.01); *B60C 15/00* (2013.01); *B60C 15/0009* (2013.01)

(58) Field of Classification Search
CPC ....... B60C 13/00; B60C 13/003; B60C 13/02; B60C 15/00; B60C 15/0036;
(Continued)

(56) References Cited

U.S. PATENT DOCUMENTS 6,269,856 B1 *  8/2001  Ueyoko ................... B60C 3/04
                                                          152/454
9,045,008 B2 *  6/2015  Mishima ................ B60C 13/02
(Continued)

FOREIGN PATENT DOCUMENTS

CN           1190057 A      8/1998
JP         H04-151309 A     5/1992
(Continued)

OTHER PUBLICATIONS

Kurita (JP 2010-111370, May 20, 2010, machine translation).*
(Continued)

*Primary Examiner* — Robert C Dye
*Assistant Examiner* — Sedef E Paquette
(74) *Attorney, Agent, or Firm* — Oliff PLC

(57) ABSTRACT

A circumferential depressed portion extended along a tire circumferential direction is formed on an outer surface of a tire side portion of a pneumatic tire. On a tire cross-sectional plane, a rim-side outer surface formed in a range from a rim separation point to an inner-side end of the circumferential depressed portion along a tire radial direction is formed along a given circular-arc curved line. When a virtual circular-arc curved line drawn by extending the given circular-arc curved line is defined, a depth of the circumferential depressed portion with reference to the virtual circular-arc curved line is not smaller than 5 mm and not larger than 35 mm in a range of not smaller than 22% and not larger than 28% of a tire height from an bead end.

14 Claims, 4 Drawing Sheets

(58) Field of Classification Search
CPC ......... B60C 15/0054; B60C 2015/009; B60C 13/001; B60C 13/023; B60C 2200/08; B60C 2200/06; B60C 2200/065; B60C 2200/14
USPC ...................................................... 152/523
See application file for complete search history.

(56) References Cited

U.S. PATENT DOCUMENTS

| | | | |
|---|---|---|---|
| 2006/0124217 A1* | 6/2006 | Frank | B60C 3/04 152/454 |
| 2013/0168002 A1 | 7/2013 | Mishima | |
| 2013/0192738 A1* | 8/2013 | Sasaki | B60C 15/0036 152/552 |
| 2015/0013868 A1 | 1/2015 | Mishima | |

FOREIGN PATENT DOCUMENTS

| | | |
|---|---|---|
| JP | H06-32122 A | 2/1994 |
| JP | H08-48116 A | 2/1996 |
| JP | H10-193924 A | 7/1998 |
| JP | 2000-158919 A | 6/2000 |
| JP | 2000158919 A * | 6/2000 |
| JP | 2007-038817 A | 2/2007 |
| JP | 2010-111370 A | 5/2010 |
| WO | 2012/018128 A1 | 2/2012 |
| WO | WO-2012017673 A1 * | 2/2012 ......... B60C 15/0036 |
| WO | 2013-111886 A1 | 8/2013 |

OTHER PUBLICATIONS

Shigeru Endo, JP 2000-158919 machine translation (Year: 2000).*
Feb. 4, 2014 Office Action issued in Japanese Patent Application No. 2013-033450.
May 7, 2014 Office Action issued in Japanese Patent Application No. 2013-033450.
Feb. 1, 2016 Extended European Search Report issued in European Patent Application No. 14754677.4.
May 29, 2015 Notification of the First Office Action issued in Chinese Patent Application No. 201480002011.1.

* cited by examiner

HEAVY LOAD TIRE WITH CURVED SIDEWALL RECESS

TECHNICAL FIELD

The present invention relates to a tire which includes a tread portion which contacts with a ground surface, a tire side portion(s) extended form the tread portion, and a bead portion(s) which extended from the tire side portion.

BACKGROUND ART

Conventionally, in a heavy load tire such as an off the road radial (ORR) tire and a truck and bus radial (TBR) tire, rubber of a tire side portion(s), especially its portion on a side of a bead portion(s), tends to be deformed due to frictions with a rim flange(s) and thrusts from the rim flange(s). In order to restrict the deformations, taken is a means for increasing a thickness of rubber of the tire side portion, especially its portion on the side of the bead portion. However, heats tend to be generated due to the deformations of the rubber when the thickness of the rubber is increased. The heat generations at the tire side portion promote deteriorations of the rubber and will deteriorate not only endurance of the bead portion but also endurance of the tire, so that desired is a tire in which temperature rises at a portion on a bead portion in a tire side portion can be restricted.

For example, proposed is a means for forming a circumferential depressed portion that is depressed inward from an outer surface of a tire side portion along a tire width direction and is extended along a tire circumferential direction with in a predetermined range of the tire side portion (e.g. Patent Literature 1), and, in a prior-art, temperature rises of a portion on a side of a bead portion in a tire side portion are restricted by such a means.

PRIOR ART DOCUMENT

Patent Documents

Patent Literature 1: Japanese Patent application Laid-Open No. 2010-111370

SUMMARY OF INVENTION

However, there is a following problem in the above-explained prior-art tire. Namely, temperature rises of a tire can be restricted by forming the circumferential depressed portion at the tire side portion, but a deformation amount of the tire side portion increases extremely when a load is applied to the tire, compared with a case were the circumferential depressed portion is not formed, and there may be a case where an inside of the tire side portion is damaged. Specifically, a carcass portion is provided inside a tire. The carcass portion includes a main portion from a tread portion to a bead core of a bead portion through a tire side portion, and a fold back portion fold back around the bead core. In addition, in the above-explained heavy load tire, an outer-side edge of the fold back portion along a tire radial direction is generally located in the tire side portion.

There is a problem that, when the deformation amount of the tire side portion increases extremely in the tire like this, shear strain generated between the main portion and the fold back portion increases and crack is generated between the main portion and the fold back portion, and thereby there the inside of the tire side portion is subject to be damaged. Namely, in a prior-art tire, it is hard to achieve both a restriction of temperature rises of a tire side portion, especially its portion on a side of a bead portion, and a restriction of damages of a tire, so that solutions are desired.

As a result of earnest researches in view of achievements of both a restriction of temperature rises at a tire side and a restriction of damages of a tire, the inventor obtains a knowledge that a depth of a circumferential depressed portion at a position of almost 25% of a tire height outward, along a tire radial direction, from a bead end located at an innermost position along the tire radial direction greatly affects a restriction of temperature rises at a tire side and a restriction of damages of a tire.

Therefore, an aspect of the present invention has a feature wherein a tire (pneumatic tire 1) comprising: a tread portion (tread portion 10) contacting with a road surface; a tire side portion (tire side portion 20) extended from the tread portion; a bead portion (bead portion 30) extended from the tire side portion; and a carcass portion (carcass portion 40) extending through the tread portion, the tire side portion and the bead portion, wherein the carcass portion includes a main portion (main portion 41) from the tread portion to a bead core of the bead portion through the tire side portion, and a fold back portion (fold back portion 42) fold back around the bead core, a circumferential depressed portion that is depressed inward along a tire width direction and is extended along a tire circumferential direction is formed on an outer surface of the tire side portion, on a tire cross-sectional plane along the tire width direction and a tire radial direction, a rim-side outer surface that is formed in a range from a rim separation point (rim separation point 61a) contacting with a rim flange to an inner-side end (100a) of the circumferential depressed portion along the tire radial direction, is formed along a given circular-arc curved line having a center of a curvature radius on an inner side along the tire width direction, and on the tire cross-sectional plane, when a virtual circular-arc curved line (virtual circular-arc curved line Vc1) drawn by extending the given circular-arc curved line is defined, a depth (depth Dx) of the circumferential depressed portion with reference to the virtual circular-arc curved line is not smaller than 5 mm and not larger than 35 mm in a range of not smaller than 22% and not larger than 28% of a tire height from the bead end.

DESCRIPTION OF EMBODIMENTS

Next, embodiments according to the present invention will be explained with reference to the drawings. Note that, in following descriptions about the drawings, identical or equivalent portions are labelled with identical or equivalent reference numbers. However, the drawings are schematic, and it should be kept in mind that ratios of dimensions and so on may be different from their actual ones. Therefore, specific dimensions and so on should be understood in consideration of following explanations. In addition, of course, it maybe probable that they include portions that are different among the drawings in their mutual relations of dimensions and their mutual ratio.

[First Embodiment]

First, a first embodiment according to the present invention will be explained.

(1) Configurations of Pneumatic Tire 1

Figure 1:
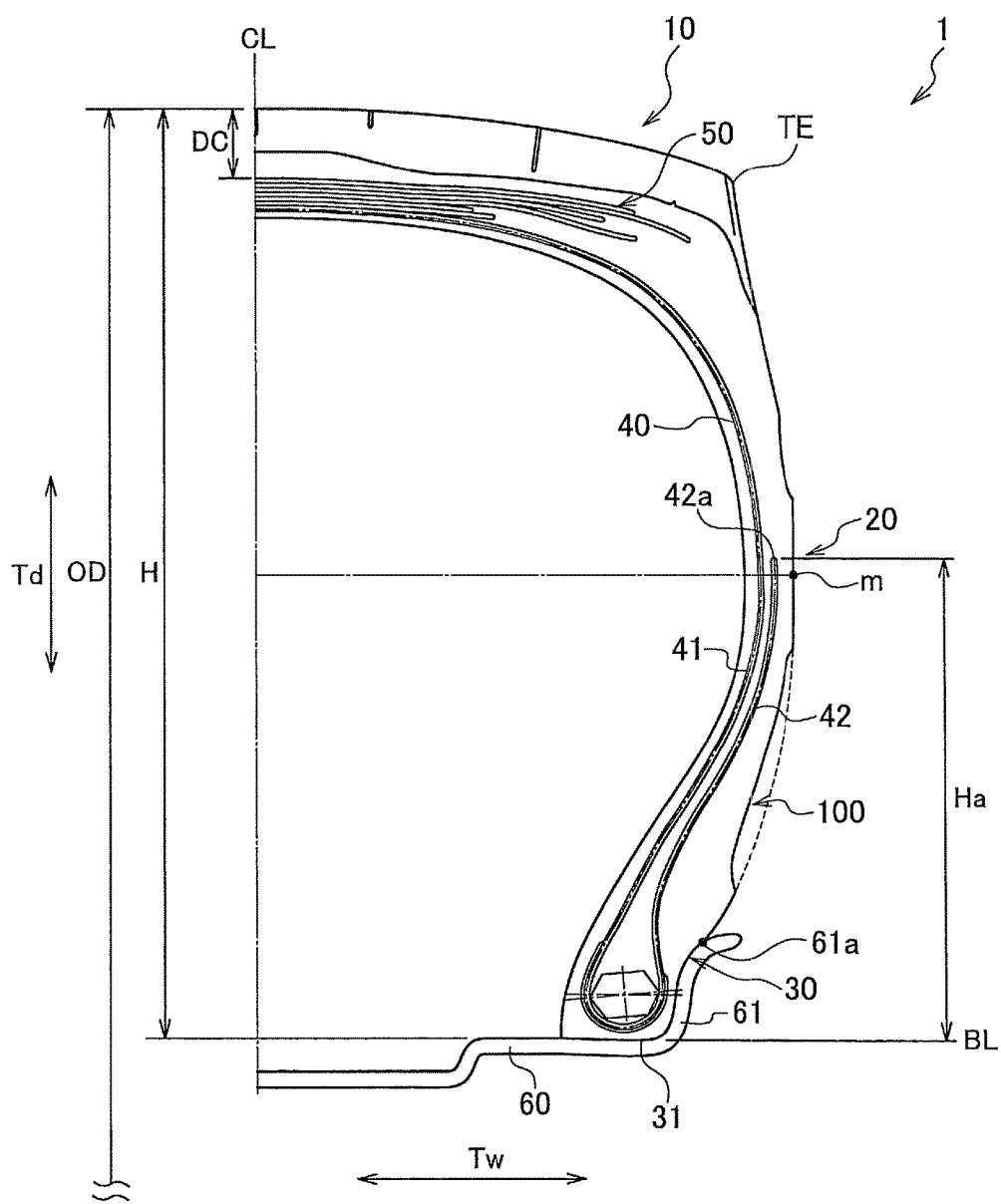
FIG. 1 is a cross-sectional view of a pneumatic tire 1 according to a first embodiment of the present invention.
Figure 2:
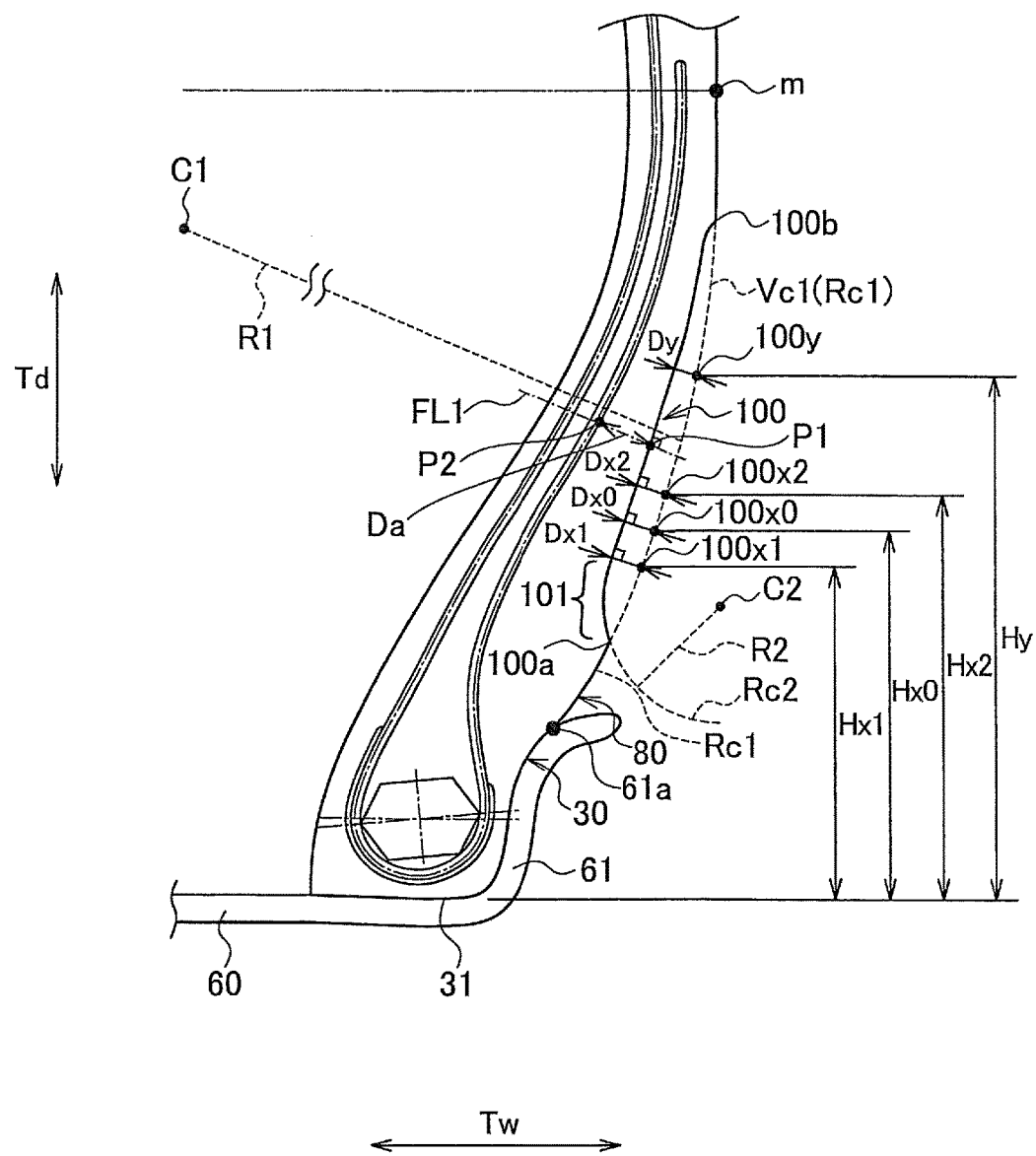
FIG. 2 is a partially enlarged cross-sectional view of the pneumatic tire 1 according to the first embodiment of the present invention.

A pneumatic tire 1 according to the present embodiment is a pneumatic tire for a heavy load (a heavy load tire) installed to a construction vehicle such as dump truck. Configurations of the pneumatic tire 1 will be explained with reference to the drawings. FIG. 1 is a partial cross-sectional view of the pneumatic tire 1 according to the present embodiment. FIG. 2 is a partially enlarged cross-sectional view of the pneumatic tire 1 according to the present embodiment.

As shown in FIG. 1, the pneumatic tire 1 includes a tread portion 10 which contacts with a ground surface while running, a tire side portion(s) 20 extended form the tread portion, and a bead portion(s) 30 which extended from the tire side portion 20. Note that the pneumatic tire 1 according to the present embodiment is assumed as a heavy load tire. Therefore, with respect to the pneumatic tire 1, it is preferable that a tire outer diameter OD and a rubber gauge thickness DC of the tread portion 10 satisfy a relation DC/OD≥0.015 on a cross-section plane of a tire equator line CL along a tire circumferential direction Tc and a tire radial direction Td. Note that the tire outer diameter OD (unit: mm) is a diameter of the pneumatic tire 1 at its portion where the outer diameter of the pneumatic tire 1 becomes maximum (generally, at the tread portion 10 near the tire equator line CL). The rubber gauge thickness DC (unit: mm) is a rubber thickness of the tread portion 10 at a position of the tire equator line CL. A thickness of belt layers 50 is not included in the rubber gauge thickness DC. Namely, the rubber gauge thickness DC of the tread portion 10 is a length from an outer-side end of the belt layers 50 along the tire radial direction Td to a tread surface on an outer-side of the tread portion 10 along the tire radial direction Td. Note that, in a case where a circumferential groove is formed at a position including the tire equator line CL, it is a rubber thickness of the tread portion 10 at a land portion adjacent to the circumferential groove.

On an outer surface of the tire side portion 20, formed is a circumferential depressed portion 100 that is depressed inward along a tire width direction Tw and is extended along the tire circumferential direction Tc. In addition, the pneumatic tire 1 includes a carcass portion(s) 40 that forms framework of the pneumatic tire 1, and the belt layers 50 disposed outside the carcass portion 40 at the tread portion 10 along the tire radial direction Td.

The carcass portion 40 is configured of carcass cords and a layer that is composed of rubber and covers the carcass cords. The carcass portion 40 is extended through the tread portion 10, the tire side portion 20, and the bead portion 30. The carcass portion 40 includes a main portion 41 from the tread portion 10 to a bead core of a bead portion 30 through the tire side portion 20, and a fold back portion 42 fold back around the bead core.

On a tire cross-sectional plane along the tire width Tw and the tire radial direction Td under an unloaded condition where a legitimate inner pressure is filled and no load is applied, an outer-side end 42a of the fold back portion 42 along the tire radial direction Td is located in a range of not smaller than 40% and not larger than 60% of a tire height H outward, along the tire radial direction Td, from a bead end 31 located at an innermost position along the tire radial direction Td. Specifically, when a length along the tire radial direction Td from the bead end 31 to the outer-side end 42a of the fold back portion 42 along the tire radial direction Td is denoted by Ha as shown in FIG. 1, a relation 0.4H≤Ha≤0.6H is satisfied. Note that, in the present embodiment, the tire height H is a length along the tire radial direction Td from the bead end 31 located an inner-side lower end along the tire radial direction Td to a tread surface of the tread portion 10 contacted with a road surface in a state where the pneumatic tire 1 is installed on a rim wheel 60 as shown in FIG. 1.

The belt layers 50 are configured by impregnating rubber component into steel cords. In addition, the belt layers 50 are composed of plural layers, and the layers are stacked along the tire radial direction Td. The bead portion(s) 30 is provided along the tire circumferential direction Tc, and disposed on both sides of the tire equator line Cl along the tire width direction Tw. Note that, since the pneumatic tire 1 has a line symmetrical construction with respect to the tire equator line CL, only its one side is shown in FIG. 1.

Note that, in the present embodiment, an outermost point along the tire radial direction Td that contacts with a rim flange 61 of the rim wheel 60 in a state where the pneumatic tire 1 is installed on the rim wheel 60 is defined as a rim separation point 61a. In addition, the state where the pneumatic tire 1 is installed on the rim wheel 60 means a state where the pneumatic tire 1 is installed on a standard rim regulated in a standard with an air pressure associated with a maximum load regulated in the standard. It is also regarded as a state where the pneumatic tire 1 is installed on the rim wheel under the unloaded condition where a legitimate inner pressure is filled thereto and no load is applied thereto.

Here, the standard is a JATMA YEAR BOOK (for year 2010, Standard of the Japan Automobile Tyre Manufacturers Association). Note that, in a case where the TRA Standard, the ETRTO Standard or the like is applied in a region where it is used or manufactured, it should comply with each standard. In addition, it is defined in the present embodiment that a border between the tread portion 10 and the tire side portion 20 is a tread edge portion TE, and a border between the tire side portion 20 and the bead portion 30 is the rim separation point 61a.

In addition, in the present embodiment, a rim-side outer surface 80 is formed, on an outer surface of the tire side portion 20, in a range from the rim separation point 61a to an inner-side end 100a of the circumferential depressed portion 100 along the tire radial direction Td on a cross-sectional plane of the pneumatic tire 1 along the tire width direction Tw and the tire radial direction Td.

As shown in FIG. 2, the rim-side outer surface 80 is formed along a given circular-arc curved line Rc1 having a center C1 of its curvature radius R1 on an inner side along the tire width direction Tw. Namely, the rim-side outer surface 80 is formed to have a curved-surface shape bulging outward along the tire width direction Tw. By forming the rim-side outer surface 80 in this manner, certain tire rigidity is secured in a range on a side of the bead portion 30 in the tire side portion 20.

Note that it is preferable that the center C1 of the curvature radius R1 is located on a virtual straight line extending from a position of a tire maximum width portion m along the tire width direction Tw. In addition, the inner-side end 100a of the circumferential depressed portion 100 along the tire radial direction Td is also defined as a border point between an outer surface of the circumferential depressed portion 100 and a tire outer surface (the rim-side outer surface 80) formed to have a curved-surface shape on the tire cross-sectional plane.

(2) Configurations of Circumferential Depressed Portion

Next, configurations of the circumferential depressed portion 100 will be explained specifically. The circumferential depressed portion 100 is formed in a range from a position of the tire maximum width portion m to the rim separation point 61a.

As shown in FIG. 2, in the present embodiment, on a tire cross-sectional plane under the unloaded condition, defined is a virtual circular-arc curved line Vc1 drawn by extending the given circular-arc curved line Rc1 along the rim-side outer surface 80 over a range in which the circumferential depressed portion 100 is formed. In addition, in the present embodiment, when the virtual circular-arc curved line Vc1 drawn by extending the given circular-arc curved line Rc1 is defined, a depth Dx (depressed portion depth Dx) of the circumferential depressed portion 100 with reference to the virtual circular-arc curved line Vc1 is not smaller than 5 mm and not larger than 35 mm in a range of not smaller than 22% and not larger than 28% of the tire height H from the bead end 31. In addition, it should be kept in mind that the depth Dx of the circumferential depressed portion 100 is a maximum depth in the range of not smaller than 22% and not larger than 28% of the tire height H from the bead end 31. Note that a depth with reference to the virtual circular-arc curved line Vc1 is a distance, under a condition where drawn is a line perpendicular to the outer surface of the circumferential depressed portion 100 with reference to the virtual circular-arc curved line Vc1, from a point where the perpendicular line intersects with the outer surface of the circumferential depressed portion 100 to a point where the perpendicular line intersects with the virtual circular-arc curved line Vc1.

In addition, in the range of not smaller than 22% and not larger than 28% of the tire height H from the bead end 31, the depth Dx (depressed portion depth Dx) of the circumferential depressed portion 100 with reference to the virtual circular-arc curved line Vc1 is not smaller than 0.037% and not larger than 0.56% of the tire height H.

In addition, in the range of not smaller than 22% and not larger than 28% of the tire height H from the bead end 31, the depth Dx (depressed portion depth Dx) of the circumferential depressed portion 100 with reference to the virtual circular-arc curved line Vc1 is not smaller than 0.1% and not larger than 1.6% of a tire width.

In addition, as shown in FIG. 2, a position 100$x$1 is a point, on the virtual circular-arc curved line Vc1, locating at a height Hx1 that is 22% of the tire height H from the bead end 31 along the tire radial direction Td. A position 100$x$0 is a point, on the virtual circular-arc curved line Vc1, locating at a height Hx0 that is 25% of the tire height H from the bead end 31 along the tire radial direction Td. A position 100$x$2 is a point, on the virtual circular-arc curved line Vc1, locating at a height Hx2 that is 28% of the tire height H from the bead end 31 along the tire radial direction Td.

In FIG. 2, when drawn is a perpendicular line that passes through the position 100$x$1 and is perpendicular to a surface (bottom surface) of the circumferential depressed portion 100, a depth Dx1 of the circumferential depressed portion 100 is a distance from the position 100$x$1 to the surface of the circumferential depressed portion 100 along the perpendicular line. Similarly, a depth Dx0 of the circumferential depressed portion 100 is a distance from the position 100$x$0 to the surface of the circumferential depressed portion 100 along a perpendicular line passing through the position 100$x$0. Similarly, a depth Dx2 of the circumferential depressed portion 100 is a distance from the position 100$x$2 to the surface of the circumferential depressed portion 100 along a perpendicular line passing through the position 100$x$2.

In addition, in the present embodiment, the depth Dx of the circumferential depressed portion 100 in a range from the position 100$x$1 to the position 100$x$2 is not smaller than 5 mm and not larger than 35 mm. Namely, the depth Dx1 satisfies a relation 5 mm≤Dx0≤35 mm, the depth Dx0 satisfies a relation 5 mm≤Dx1≤35 mm, and the depth Dx2 satisfies a relation 5 mm≤Dx2≤35 mm.

Note that, in FIG. 2, a position 100$y$ is a point, on the virtual circular-arc curved line Vc1, locating at a height Hy that is 35% of the tire height H from the bead end 31 along the tire radial direction Td. When drawn is a perpendicular line that passes through the position 100$y$ and is perpendicular to the outer surface of the circumferential depressed portion 100, a depth Dy of the circumferential depressed portion 100 is a distance from the position 100$y$ to the surface of the circumferential depressed portion 100 along the perpendicular line.

In the present embodiment, on a tire cross-sectional plane under the unloaded condition, a difference between a deepest portion at which a depth of the circumferential depressed portion 100 is deepest with respect to the virtual circular-arc curved line Vc1 and a shallowest portion at which a depth of the circumferential depressed portion 100 is shallowest with respect to the virtual circular-arc curved line Vc1, in a range of not smaller than 25% and not larger than 35% of the tire height H from the bead end 31, is not larger than 15 mm.

Specifically, in an example shown in FIG. 2, in a range of not smaller than 25% and not larger than 35% of the tire height H from the bead end 31, the position 100$x$0 that is 25% of the tire height H is the deepest portion, and the position 100$y$ that is 35% of the tire height H is the shallowest portion. Therefore, the maximum depth Dx0 of the circumferential depressed portion 100 and the minimum depth Dy of the circumferential depressed portion 100 satisfy a relation Dx0−Dy≤15 mm, In addition, in the present embodiment, in a range of not smaller than 22% and not larger than 28% of the tire height H from the bead end 31, a ratio of a depth of the circumferential depressed portion 100 to a thickness Da of rubber located on a side of a tire surface from the carcass portion 40 is not smaller than 1.5 and not larger than 30.

When drawn is a straight line FL1 that is perpendicular to the bottom surface of the circumferential depressed portion 100 and extends to the main portion 41 (the fold back portion 42) of the carcass portion 40 in the cross-sectional view shown in FIG. 2, the thickness Da of rubber located on a side of a tire surface from the carcass portion 40 is a distance between an intersection point P1 of the straight line FL1 and the bottom surface of the circumferential depressed portion 100 and an intersection point P2 of the straight line FL1 and the carcass portion 40 (the fold back portion 42).

If the ratio of a depth of the circumferential depressed portion 100 to the thickness Da of rubber located on a side of the tire surface from the carcass portion 40 is smaller than 1.5, a difference between a thickness at the circumferential depressed portion 100 that contributes to cooling and a thickness to be cooled (a thickness from the carcass portion 40 to the tire outer surface (the bottom surface of the circumferential depressed portion 100)) is small, and thereby a tire cooling effect by the circumferential depressed portion 100 cannot be brought greatly.

In addition, if the ratio of a depth of the circumferential depressed portion 100 to the thickness Da of rubber located on a side of the tire surface from the carcass portion 40 is larger than 30, a thickness from the carcass portion 40 to the tire outer surface becomes too small, and thereby it is concerned that the carcass portion 40 may strain easily. Especially in a heavy load tire, deformations of the tire side portion 20 while running tends to become large, so that the carcass portion 40 may not bear with the deformations and then may strain.

On the tire cross-sectional plane, a side wall surface 101 formed in a range from the inner-side end 100a of the circumferential depressed portion 100 along the tire radial direction Td to the deepest portion (the bottom surface) of the circumferential depressed portion 100 is formed along a circular-arc curved line Rc2 having a center C2 of its curvature radius R2 on an outside along the tire width direction Tw. Namely, the side wall surface 101 is formed to have a curved-surface shape. The side wall surface 101 is a wall surface of the circumferential depressed portion 100 between the inner-side end 100a along the tire radial direction Td and the bottom surface. A curvature radius of the bottom surface is larger than the curvature radius R2 of the circular-arc curved line Rc2 of the side wall surface 101. A boundary between the bottom surface and the side wall surface 101 is a portion where the curvature radius R2 changes.

Note that, in the present embodiment, the side wall surface is provided, outward from the rim separation point 61a along the tire radial direction Td, at a position within a given range. Specifically, it is preferable that the side wall surface 101 is located on an outer side from the rim separation point 61a that is an outermost point contacting with the rim flange 61 along the tire radial direction Td and is located in a range of smaller than 25% of the tire height H outward from the rim separation point 61a along the tire radial direction Td.

(5) Behaviors and Advantages

In the pneumatic tire 1 according to the present embodiment, the circumferential depressed portion 100 that is depressed inward along the tire width direction Tw and is extended along the tire circumferential direction Tc is formed on the outer surface of the tire side portion 20.

According to the pneumatic tire 1, the depth Dx of the circumferential depressed portion 100 with respect to the virtual circular-arc curved line Vc1 is not smaller than 5 mm and not larger than 35 mm in the range of not smaller than 22% and not larger than 28% of the tire height H from the bead end 31.

In the range of not smaller than 22% and not larger than 28% of the tire height H, if the depth Dx is smaller than 5 mm, effects for restricting temperature rises of rubber cannot be brought sufficiently, because a distance between a high temperature portion in an inside of the tire 1 (especially, an inside of the portion on a side of the bead portion 30) and a heat radiation surface (the surface of the circumferential depressed portion 100) cannot be shortened sufficiently. On the other hand, if the depth Dx is larger than 35 mm, a collapsing amount of the carcass portion 40 may increase during transition from the unloaded condition to a loaded condition. As a result, increase of shear strains between the main portion 41 and the fold back portion 42 may occur and cause cracks between the main portion 41 and the fold back portion 42, and thereby the inside of the tire side portion 20 may be damaged.

As explained above, according to the pneumatic tire 1, it become possible to achieve both a restriction of temperature rises of the tire side portion 20, especially its portion on a side of the bead portion 30, and a restriction of damages of the tire, by setting the depth Dx of the circumferential depressed portion 100 with respect to the virtual circular-arc curved line Vc1 to not smaller than 5 mm and not larger than 35 mm in the range of not larger than 22% and not larger than 28% of the tire height H from the bead end 31.

In addition, in the pneumatic tire 1 according to the present embodiment, an amount of rubber used in the tire side portion 20 is reduced by forming the circumferential depressed portion 100, compared with a case where the circumferential depressed portion 100 is not formed. Therefore, it becomes possible to restrict heat generation caused by deformations of rubber of the tire side portion 20. Further, since it becomes possible to reduce an amount of rubber for manufacturing the pneumatic tire 1, it becomes possible to restrict manufacturing costs of the pneumatic tire 1.

In addition, the side wall surface 101 extended from the inner-side end 100a of the circumferential depressed portion 100 along the tire radial direction Td to the deepest portion of the circumferential depressed portion 100 is formed along the circular-arc curved line Rc2 having a center C2 of its curvature radius R2 on an outside along the tire width direction Tw. Namely, in the circumferential depressed portion 100, a portion from the inner-side end 100a along the tire radial direction Td to the deepest portion is formed so as to be depressed by its curved-surface shape.

According to the pneumatic tire 1 as explained above, by rotations of the tire 1, air flowing along the tire side portion 20 easily flows into an inside of the circumferential depressed portion 100 smoothly along the side wall surface 101 having a curved-surface shape, and air in the inside of the circumferential depressed portion 100 is easily discharged out. Namely, it becomes possible to restrict temperature rises of rubber, by increasing an amount of the air circulating through the inside of the circumferential depressed portion 100.

Note that it is preferable that the curvature radius R2 of the circular-arc curved line Rc2 formed by the side wall surface 101 on the cross-sectional plane along the tire width 10 direction Tw and the tire radial direction Td of the pneumatic tire 1 is not smaller than 50 mm under the unloaded condition. If the curvature radius R2 of the side wall surface 101 is smaller than 50 mm, strains of the side wall surface 101 caused by collapsing of the tire side portion 20 under the loaded condition are converged locally, and thereby anti-crack quality of a portion on a side of the bead portion 30 in the tire side portion 20 may be degraded. In addition, in the pneumatic tire 1, a curvature radius Ra of the side wall surface 101 under the unloaded condition where a legitimate inner pressure is filled thereto and no load is applied thereto and a curvature radius Rb of the side wall surface 101 under a legitimately loaded condition where a legitimate inner pressure is filled thereto and a legitimate load is applied thereto, may satisfy a relation $(Ra-Rb)/Ra \leq 0.5$.

Similarly, an outer-side wall surface located on an outer side from the circumferential depressed portion 100 along the tire radial direction Td may be also formed along a circular-arc curved line having a center of its curvature radius on an outside along the tire width direction Tw. Namely, in the circumferential depressed portion 100, a portion from an outer-side end 100b along the tire radial direction Td to the deepest portion is formed so as to be depressed by its curved-surface shape.

In addition, in the pneumatic tire 1 according to the present embodiment, on the tire cross-sectional plane under unloaded condition, the difference between the deepest portion of the circumferential depressed portion 100 with respect to the virtual circular-arc curved line Vc1 and the shallowest portion of the circumferential depressed portion 100 with respect to the virtual circular-arc curved line Vc1, in the range of not smaller than 25% and not larger than 35% of the tire height H from the bead end 31, is not larger than 15 mm. If the difference between the deepest portion and the shallowest portion is larger than 15 mm, a shape of a tire mold is formed to have an excessively bulged shape (a tire shape becomes a depressed shape), so that manufacturing failures such as bares may tend to occur when manufacturing the pneumatic tire(s) 1. Therefore, it becomes possible to restrict occurrences of manufacturing failures, by forming a smooth shape formed by making the difference between the deepest portion and the shallowest portion not larger than 15 mm.

In addition, in the present embodiment, it is preferable that the side wall surface 101 of the circumferential depressed portion 100 is located on the outer side from the rim separation point 61a that is the outermost point contacting with the rim flange 61 along the tire radial direction Td and is located in the range of smaller than 25% of the tire height H outward from the rim separation point 61a along the tire radial direction Td.

According to the pneumatic tire 1, by providing the inner-side end 100a of the circumferential depressed portion 100 along the tire radial direction Td on the outer side from the rim separation point 61a, collapsing of the carcass portion 40 under a load application can be prevented from getting worse largely and thereby temperature rises can be restricted. If the side wall surface 101 is provided so that the inner-side end 100a is located on an inner side from the rim separation point 61a along the tire radial direction Td, collapsing of the carcass portion 40 when a load is applied increases, and thereby endurance of the bead portion 30 is extremely degraded. In addition, by providing the side wall surface 101 in the range of smaller than 25% of the tire height H from the rim separation point 61a, it becomes possible to shorten a distance between a high temperature area in the inside of the tire 1 and the surface of the circumferential depressed portion 100 that is a heat radiation surface, and thereby effects for restricting temperature rises can be brought. If it is provided at a position of larger than 25% of the tire height H, it becomes impossible to shorten the distance between the high temperature area in the inside of the tire 1 and a tire surface (the side wall surface 101) that is the heat radiation surface, and thereby it becomes hard to get effects for restricting temperature rises.

[Second Embodiment]

Figure 3:
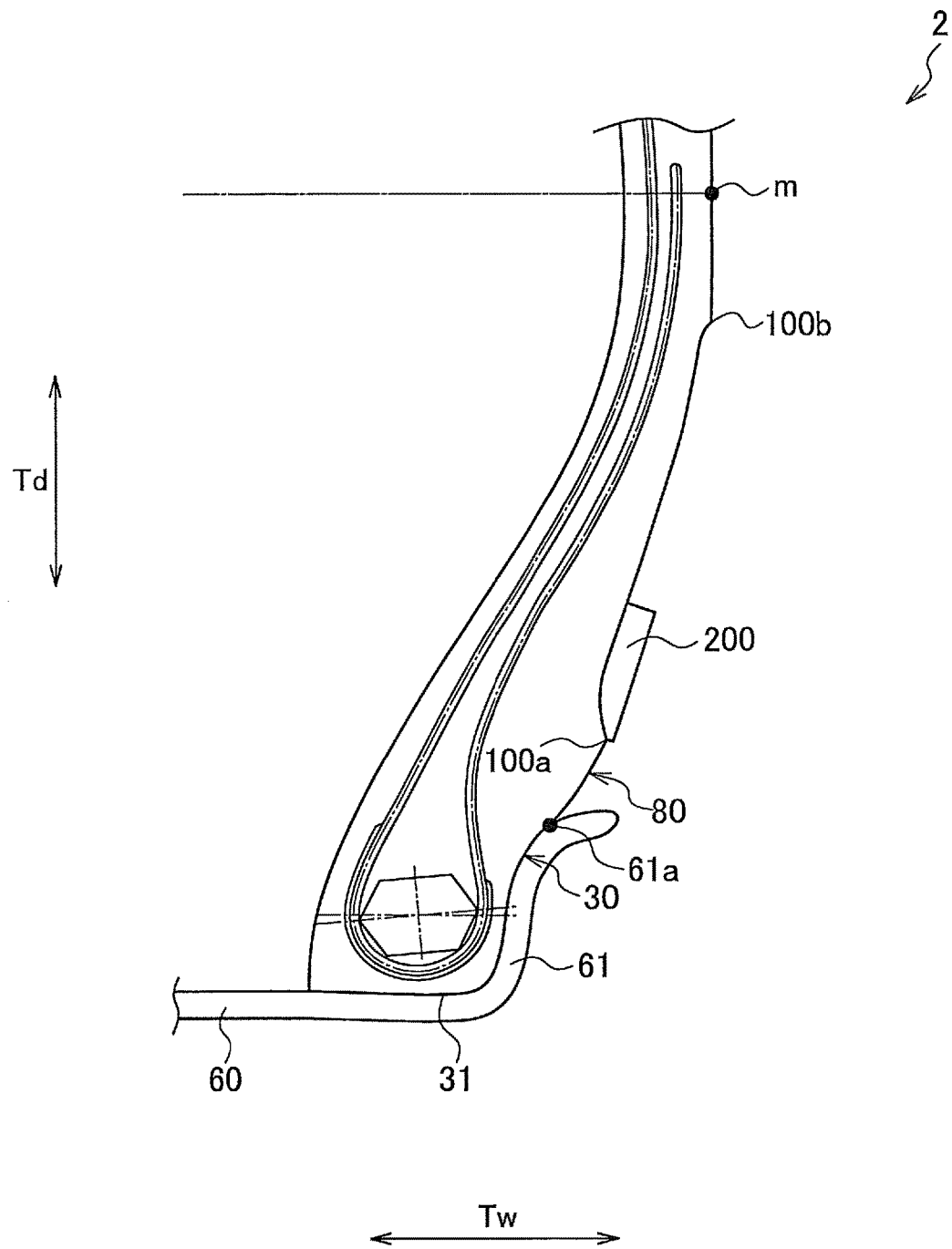
FIG. 3 is a partially enlarged cross-sectional view of a pneumatic tire 1 according to a second embodiment of the present invention.

A pneumatic tire 2 according to a second embodiment of the present invention will be explained. Note that detailed explanations for equivalent configurations to those in the first embodiment will be omitted accordingly. FIG. 3 is a partially enlarged cross-sectional view of a circumferential depressed portion 100 in the second embodiment.

In the pneumatic tire 2 according to the present embodiment, blocks 200 protruded outward along the tire width direction Tw are formed in the circumferential depressed portion 100 with given pitches along the tire circumferential direction Tc.

In addition, a portion of each of the blocks 200 is disposed in an area of the side wall surface 101. Note that the blocks 200 may be disposed outside the area of the side wall surface 101.

According to the pneumatic tire 2 in the present embodiment, air smoothly flowing into the circumferential depressed portion 100 along the side wall surface 101 having a curved-surface shape strikes on the blocks 200, so that the air flowing into the circumferential depressed portion 100 as turbulence can be made active.

In addition, in the present embodiment, it is preferable that a height h of the block(s) 200 is in a range of not smaller than 7.5 mm and not larger than 25 mm. According to the pneumatic tire 2, even when the pneumatic tire 2 is used in any speed range among practical speed ranges of a tire for a construction vehicle, effects for restricting temperature rises of rubber can be brought.

In addition, in the present embodiment, it is preferable that a width w of the block(s) 200 along the tire circumferential direction Tc is in a range of not smaller than 2 mm and not larger than 10 mm. If the width w of the block(s) 200 along the tire circumferential direction Tc is smaller than 2 mm, it is concerned that the blocks 200 is vibrated by air flow drawn into the circumferential depressed portion 100. Further, if the width w of the block(s) 200 along the tire circumferential direction Tc is smaller than 2 mm, rigidity of each of the blocks 200 reduces and thereby they may be damaged by rough-road running. On the other hand, if the width w of the block(s) 200 along the tire circumferential direction Tc is larger than 10 mm, an amount of rubber required for each of the blocks 200 increases and thereby heats tend to be easily generated. As a result, effects for restricting temperature rises brought by forming the circumferential depressed portion 100 is subject to become low.

In addition, it is preferable that the block 200 is formed in a plurality with given pitches along the tire circumferential direction Tc. It is preferable that the height h of the block 200, the given pitch p of the block 200 along the tire circumferential direction Tc, and the width of the block w, satisfy relations $1.0 \leq p/h \leq 50.0$, and $1.0 \leq (p-w)/w \leq 100.0$. According to the pneumatic tire 2, even when the pneumatic tire 2 is used in any speed range among practical speed ranges of a tire for a construction vehicle, the air flowing into the circumferential depressed portion 100 as turbulence can be made active more surely. Namely, effects for restricting temperature rises of rubber can be brought more surely.

In addition, it is preferable that a portion of the block(s) 200 is formed so as to be protruded outward along the tire width direction Tw from the virtual circular-arc curved line Vc1 by a given protruded height. According to the pneumatic tire 2, air flowing along the outer surface of the tire side portion 20 strikes on the protruded portions of the blocks 200, and thereby easily flows into the inside of the circumferential depressed portion 100. Namely, it becomes possible to restrict temperature rises of rubber by increasing an amount of air circulating through the inside of the circumferential depressed portion 100.

Note that, in the present embodiment, a case where the block(s) 200 has an integrated shape extending along the tire radial direction Td is explained as an example, but the block(s) 200 may be divided to plural pieces along the tire radial direction Td.

[Comparative Evaluation]

Next, comparative estimations made by using following a conventional sample, comparative samples and practical samples will be explained in order to clarify advantages of the present invention further. Note that the present invention is not limited by these samples.

(1) Evaluation Method

Experiments are made by using plural types of pneumatic tires, and then an effect for restricting temperature rises of the tires and strain in the carcass portion 40 are evaluated.

Figure 4:
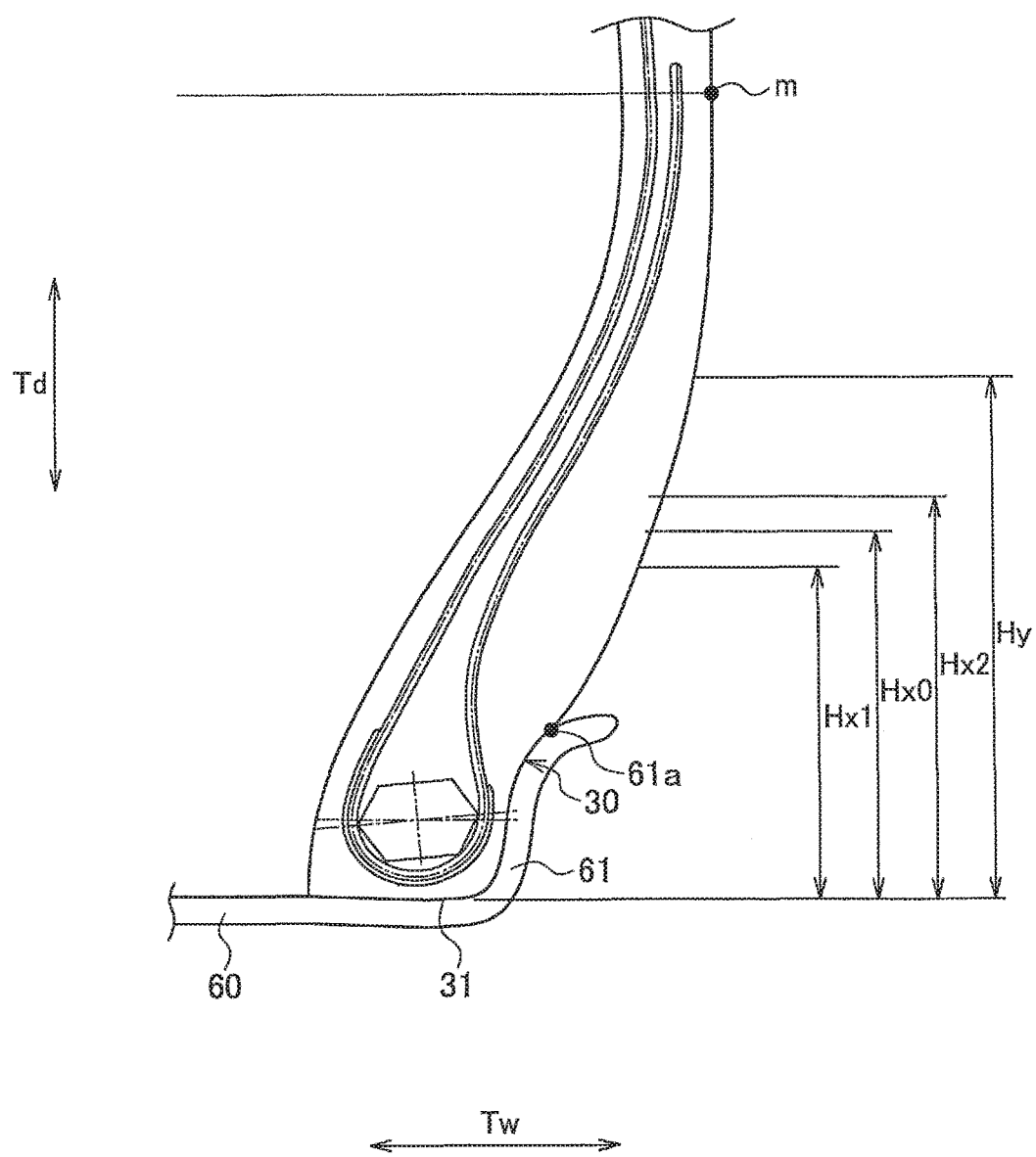
FIG. 4 is a partially enlarged cross-sectional view of a pneumatic tire 1 according to a prior-art.

As the pneumatic tire according to the conventional sample, a pneumatic tire in which a circumferential depressed portion is not formed on its tire side portion is used, as shown in FIG. 4. Note that, in the pneumatic tire according to the conventional sample, an outer surface of the tire side portion has a shape along the virtual circular-arc curved line Vc1 on its tire cross-sectional plane.

As the pneumatic tires according to the comparative samples 1 to 2 and the practical samples 1 to 5, pneumatic tires in each of which a circumferential depressed portion is formed on its tire side portion are used. Note that detailed configurations of the comparative samples 1 to 2 and the practical samples 1 to 5 are shown in a Table 1. Note that each tire size of the tires is 59/80R63.

<Strain Evaluation Experiment>

With respect to a stain evaluation experiment, strain generated between the main portion and the fold back portion in the carcass portion of each of the tire is evaluated by making simulations using Finite Element Method (FEM) analysis. Specifically, stain is calculated on a plane model for flat-pressurizing under a condition where each of the tires is installed on a standard rim (compliant with the TRA) and a legitimate inner pressure (compliant with the TRA) and a legitimate load (compliant with the TRA) are given. Measurement results shown in the Table 1 are index numbers when strain of the conventional sample is defined as a reference (100). Note that it is indicated that the smaller this value is, the smaller the strain is, and it is superior.

<Temperature Evaluation Experiment>

With respect to a temperature evaluation experiment, temperature of the bead portion is measured after rotating on a drum experiment machine under a condition where each of the tires is installed on a standard rim (compliant with the TRA) and a legitimate inner pressure (compliant with the TRA) and a legitimate load (compliant with the TRA) are given. Specifically, temperature of the bead portion is measured after 24 hour running with a speed 8 km/h. Measurement results shown in the Table 1 are difference values of the tires when temperature of the conventional sample is defined as a reference. Note that it is indicated that the larger this value in a minus (−) direction is, the better its effect for restricting temperature rises is.

<Crack Evaluation Experiment>

With respect to a crack evaluation experiment, further 300 hours running is made with an inner pressure 180% higher than the legitimate inner pressure (compliant with the TRA) after the above-explained temperature evaluation experiment. Then, each of the tires is cut to confirm whether or not a crack(s) occurs between the main portion and the fold back portion in the carcass portion.

<Manufacturing Failure Experiment>

With respect to a manufacturing failure experiment, it is confirmed whether or not a bare(s) occurs when manufacturing each of the tires.

(2) Evaluation Result

Evaluation results of the pneumatic tires will be explained with reference to the Table 1.

TABLE 1

| CONTENTS | | CONVENTIONAL SAMPLE | COMPARATIVE SAMPLE 1 | COMPARATIVE SAMPLE 2 | PRACTICAL SAMPLE 1 | PRACTICAL SAMPLE 2 | PRACTICAL SAMPLE 3 | PRACTICAL SAMPLE 4 | PRACTICAL SAMPLE 5 |
|---|---|---|---|---|---|---|---|---|---|
| CONFIGURATION OF EACH TIRE | DEPTH Dx1 AT POSITION (100X1) OF 22% OF TIRE HEIGHT H | 0 mm | 36 mm | 9 mm | 24 mm | 5 mm | 10 mm | 34 mm | 0 mm |
| | DEPTH Dx0 AT POSITION (100X0) OF 25% OF TIRE HEIGHT H | 0 mm | 37 mm | 37 mm | 25 mm | 5 mm | 10 mm | 35 mm | 0 mm |
| | DEPTH Dx2 AT POSITION (100X2) OF 28% OF TIRE HEIGHT H | 0 mm | 36 mm | 36 mm | 24 mm | 5 mm | 10 mm | 34 mm | 20 mm |
| | DIFFERENCE BETWEEN DEEPEST PORTION AND SHALLOWEST PORTION IN RANGE OF NOT SMALLER THAN 25% AND NOT LARGER THAN 35% OF TIRE HEIGHT H | 0 mm | 16 mm | 10 mm | 6 mm | 0 mm | 10 mm | 16 mm | 5 mm |
| MEASUREMENT RESULT OF STRAIN (FEM) | SHEAR STRAIN BETWEEN MAIN PORTION AND FOLD BACK PORTION IN CARCASS PORTION | 100 | 110 | 109 | 103 | 100 | 101 | 105 | 101 |
| MEASUREMENT RESULT OF TEMPERATURE | TEMPERATURE DIFFERENCE AFTER 24 H RUNNING WITH REFERENCE TO CONVENTIONAL SAMPLE (° C.) | — | −1.7 | −1.6 | −3.4 | −0.8 | −2.3 | −2.2 | −1.2 |
| MEASUREMENT RESULT FOR CRACK | CRACK(S) IN CARCASS PORTION AFTER 300 H RUNNING | NONE | PRESENTED | PRESENTED | NONE | NONE | NONE | NONE | NONE |
| MEASUREMENT RESULT FOR MANUFACTURING FAILURE | MOLDING FAILURE WHEN MAUFACTURING | NONE | BARE(S) PRESENTED | NONE | NONE | NONE | NONE | BARE(S) PRESENTED | NONE |

As shown in the Table 1, it is verified that the pneumatic tires according to the practical samples 1 to 5 have better effects for restricting temperature rises of the bead portion 30 than the tire according to the conventional sample.

In addition, a crack(s) is confirmed in the pneumatic tires according to the comparative samples 1 to 2, so that it is confirmed that an effect for restricting occurrence of a cracks) are improved by making the depth Dx not larger than 35 mm in the range of not smaller than 25% and not larger than 35% of the tire height H like as the practical samples 1 to 5. Note that, if taking into account the restriction of molding failures (a bare(s)) when manufacturing as presented in the practical sample 4, it is confirmed that the difference between the deepest portion and the shallowest portion in the range of not smaller than 25% and not larger than 35% of the tire height H is preferably at least not larger than 15 mm.

[Other Embodiments]

As explained above, contents of the present invention are explained through the embodiments of the present invention, but descriptions and drawings that is a part of this disclosure should not be understood as ones limit the present invention. For a person ordinarily skilled in the art, alternative embodiments, practical samples and practical techniques become apparent from this disclosure.

For example, in the embodiments of the present invention, cases where the pneumatic tire is a heavy load tire is explained as examples, but it may be other types of tires such as a tire for a passenger car.

In addition, it may be a pneumatic tire into which air, nitrogen gas or the like is filled, and a solid tire into which air, nitrogen gas or the like is not filled.

In addition, each feature of the above-explained embodiments can be combined with each other in within a scope that doesn't impair the invention. Note that, in each of the embodiments and modified examples, detailed explanations for equivalent configurations are omitted accordingly.

In this manner, needless to say, the present invention contains various embodiments not described here. Therefore, a technical scope of the present invention should be determined only by matters that and specifies the invention according to Claims and reasonable from the above descriptions.

Note that all contents of a Japanese Patent Application No. 2013-033450 (filed on Feb. 22, 2013) are incorporated into the Description of the present application by reference.

INDUSTRIAL APPLICABILITY

A tire according to the present invention can provide a tire that can achieve both a restriction of temperature rises of a tire side portion, especially its portion on a side of a bead portion, and a restriction of damages of the tire.

The invention claimed is:

1. A heavy load tire comprising: a tread portion contacting with a road surface; a tire side portion extended from the tread portion; a bead portion extended from the tire side portion; and a carcass portion extending through the tread portion, the tire side portion and the bead portion, wherein
the carcass portion includes a main portion extending from the tread portion to a bead core of the bead portion through the tire side portion, and a fold back portion folded back around the bead core,
a circumferential depressed portion is formed on an outer surface of the tire side portion, the circumferential depressed portion being depressed inward along a tire width direction and being extended along a tire circumferential direction,
on a tire cross-sectional plane along the tire width direction and a tire radial direction, a rim-side outer surface is formed along a given circular-arc curved line having a center of a curvature radius on an inner side along the tire width direction, the rim-side outer surface being formed in a range from a rim separation point contacting with a rim flange to an inner-side end of the circumferential depressed portion along the tire radial direction,
a depth of the circumferential depressed portion is not smaller than 5mm and not larger than 35 mm and is not smaller than 0.037% and not larger than 0.56% of a tire height, the depth being measured in a range between 22% and 28% of the tire height from a bead end located at an innermost position along the tire radial direction, and the depth being defined with reference to a virtual circular-arc curved line extending from the given circular-arc curved line in the tire cross-sectional plane,
on the tire cross-sectional plane under an unloaded condition where a normal inner pressure in accordance with an industry standard is filled and no load is applied, an outer-side end of the fold back portion along the tire radial direction is located in a range between 40% and 60% of the tire height outward, along the tire radial direction, from the bead end located at the innermost position along the tire radial direction,
on the tire cross-sectional plane, a concave side wall surface is formed along a circular-arc curved line having a center of a curvature radius thereof on an outer side along the tire width direction, the concave side wall surface being formed in a range from the inner-side end of the circumferential depressed portion along the tire radial direction to a deepest portion at which the depth of the circumferential depressed portion with reference to the virtual circular-arc curved line is deepest,
on the tire cross-sectional plane, the curvature radius of the circular-arc curved line formed by the concave side wall surface is not smaller than 50 mm, and
the outer-side end of the fold back portion along the tire radial direction is located on an outer side along the tire radial direction from a tire maximum width portion.

2. The tire according to claim 1, wherein,
on the tire cross-sectional plane, the concave side wall surface is located on an outer side from the rim separation point along the tire radial direction and is located in a range of smaller than 25% of the tire height outward from the rim separation point along the tire radial direction.

3. The tire according to claim 1, wherein,
on the tire cross-sectional plane, in the range between 25% and 35% of the tire height from the bead end, a difference between a depth of the circumferential depressed portion at the deepest portion and a depth of the circumferential depressed portion at a shallowest portion at which the depth of the circumferential depressed portion with reference to the virtual circular-arc curved line is shallowest is not larger than 15 mm.

4. The tire according to claim 1, wherein
blocks protruded outward along the tire width direction are formed in the circumferential depressed portion with given pitches along the tire circumferential direction.

5. The tire according to claim 1, wherein
a thickness of rubber between the fold back portion of the carcass portion and a bottom surface of the circumferential depressed portion decreases gradually from a boundary between the bottom surface and the concave side wall surface toward an outer side in the tire radial direction.

6. The tire according to claim 1, wherein
the depth of the circumferential depressed portion is not smaller than 10 mm and not larger than 35 mm.

7. The tire according to claim 1, wherein when a curvature radius of the concave side wall surface under an unloaded condition where an inner pressure is filled thereto and no load is applied thereto is denoted as Ra and a curvature radius of the concave side wall surface under a loaded condition where an inner pressure is filled thereto and a load is applied thereto is denoted as Rb, a relation (Ra−Rb)/Ra<0.5 is satisfied.

8. The tire according to claim 1, wherein
a plurality of blocks is formed in the circumferential depressed portion, the plurality of blocks being protruded outward along the tire width direction from an outer surface of the circumferential depressed portion and aligned along the tire circumferential direction with given pitches.

9. The tire according to claim 8, wherein
a portion of each of the blocks is disposed in an area of the concave side wall surface.

10. The tire according to claim 9, wherein
each of the blocks is disposed outside the area of the concave side wall surface.

11. The tire according to claim 8, wherein
a height of each of the blocks is not smaller than 7.5 mm and not larger than 25 mm.

12. The tire according to claim 11, wherein
a width of each of the blocks along the tire circumferential direction is not smaller than 2 mm and not larger than 10 mm.

13. The tire according to claim 12, wherein
when each of the given pitches is denoted as p, the height of each of the blocks is denoted as h and the width of each of the blocks is denoted as w, relations $1.0 \leq p/h \leq 50.0$ and $1.0 \leq (p-w)/w \leq 100.0$ are satisfied.

14. The tire according to claim 8, wherein each of the blocks protrudes outward along the tire width direction from the virtual circular-arc curved line.

* * * * *